F. KRÄTZIG.
HORSESHOE.
APPLICATION FILED DEC. 13, 1911.
1,048,180.
Patented Dec. 24, 1912.
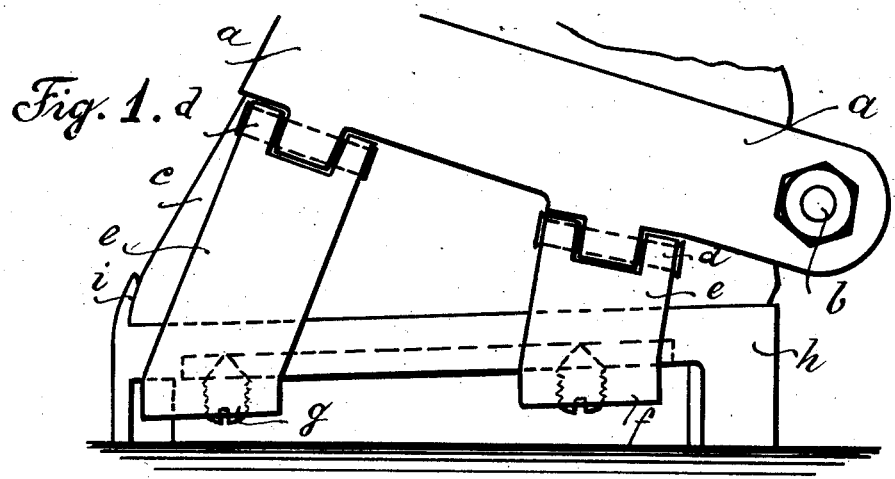
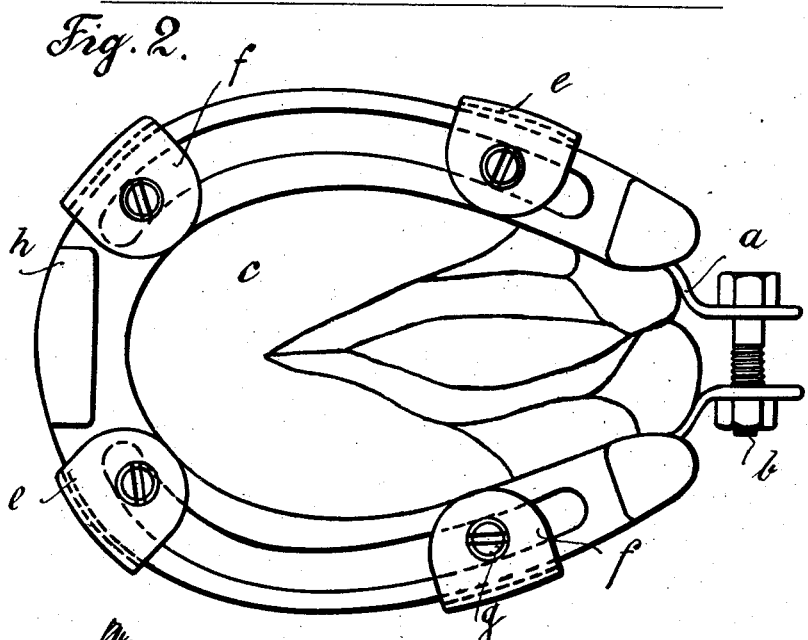
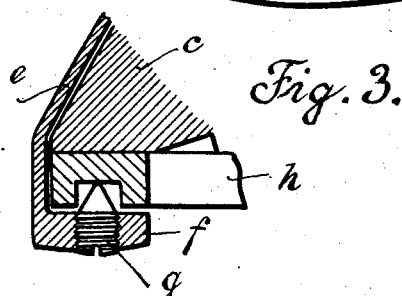
Witnesses
P. Kappes
M. Müller
Inventor
Fritz Krätzig

UNITED STATES PATENT OFFICE.

FRITZ KRÄTZIG, OF NIEDER-LICHTENAU, GERMANY.

HORSESHOE.

1,048,180.  Specification of Letters Patent.  Patented Dec. 24, 1912.

Application filed December 13, 1911. Serial No. 665,508.

*To all whom it may concern:*

Be it known that I, FRITZ KRÄTZIG, a subject of the German Emperor, and resident of Nieder-Lichtenau, Germany, have invented certain new and useful Improvements in Horseshoes, of which the following is a specification.

This invention relates to improvements in horseshoes, and more particularly to improved means for fixing the horseshoe to the hoof of the animal, which are shown on the accompanying drawing.

Figure 1 is a side view, Fig. 2 an underside plan view, and Fig. 3 a vertical section through part, of the same.

Around the hoof $c$, a clamp $a$ is placed and fixed thereto at the rear by a screw $b$. On the lower end of said clamp a number of holders $e$ are pivoted at $d$, which with their bent ends $f$ embrace the horseshoe $h$ from below. In each of said bent ends, a set-screw $g$ is provided, said set-screws having points which enter grooves on the lower side of the shoe $h$, whereby the latter is pressed onto the hoof. At the front, or also at other places, the horseshoe may be provided with an upper projection $i$ which, by catching over the hoof, prevents the horseshoe from shifting.

I claim:—

The combination of a horseshoe having grooves in its lower side, a clamp designed to be placed around the hoof to which the shoe is to be attached, a number of depending holders pivoted to said clamp and provided with bent ends designed to embrace the horseshoe from below, and set-screws in said bent ends having points to enter said grooves, for the purpose set forth.

In testimony whereof I have hereunto set my hand in the presence of two subscribing witnesses.

FRITZ KRÄTZIG.

Witnesses:
 RUDOLF SCHMIDT,
 ERNST KATZ.

---

Copies of this patent may be obtained for five cents each, by addressing the "Commissioner of Patents Washington, D. C."